United States Patent
Peuhkurinen et al.

(10) Patent No.: US 11,379,621 B2
(45) Date of Patent: Jul. 5, 2022

(54) APPARATUS AND METHOD FOR TRACKING ACCESS PERMISSIONS OVER MULTIPLE EXECUTION ENVIRONMENTS

(71) Applicant: Huawei Technologies Co., Ltd., Shenzhen (CN)

(72) Inventors: Antti Erik Peuhkurinen, Kista (SE); Dmitry Kasatkin, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 16/383,287

(22) Filed: Apr. 12, 2019

(65) Prior Publication Data
US 2019/0236312 A1    Aug. 1, 2019

Related U.S. Application Data

(63) Continuation of application No. PCT/EP2016/074750, filed on Oct. 14, 2016.

(51) Int. Cl.
*G06F 21/62*    (2013.01)
*G06F 21/52*    (2013.01)
(Continued)

(52) U.S. Cl.
CPC ........ *G06F 21/6281* (2013.01); *G06F 21/121* (2013.01); *G06F 21/52* (2013.01);
(Continued)

(58) Field of Classification Search
CPC .. G06F 21/6281; G06F 21/6218; G06F 21/52; G06F 21/121; G06F 21/604;
(Continued)

(56) References Cited

U.S. PATENT DOCUMENTS 8,397,290 B2 * 3/2013 Coles .................. G06F 9/468
726/20
8,656,465 B1 * 2/2014 Fong-Jones ......... G06F 21/6281
726/5

(Continued)

FOREIGN PATENT DOCUMENTS

CN    102999343 A    3/2013
CN    103268438 A    8/2013
EP     1788505 A1    5/2007

OTHER PUBLICATIONS

Zhou, Q., Wang, D., Zhang, Y., Qin, B., Yu, A., and Zhao, B., ChainDroid: Safe and Flexible Access to Protected Android Resources Based on Call Chain, 2013, IEEE, pp. 156-162: (Year: 2013).*

(Continued)

*Primary Examiner* — Saleh Najjar
*Assistant Examiner* — Nhan Huu Nguyen
(74) *Attorney, Agent, or Firm* — Leydig, Voit & Mayer, Ltd.

(57) ABSTRACT

A computing apparatus includes a processor coupled to a memory. The memory stores a set of permission chains, and each permission chain indicates a prior process accessed a current process and the current process requested access to a next process. The processor receives a permission request including a request for an access permission to allow a first current process to access a first next process and an indication that the first current process was accessed from a first prior process. The processor searches the set of permission chains for a matching permission chain, and when the matching permission chain is not found, the processor receives an input granting or denying the requested permission, and when granted updates the set of permission chains to include the granted permission chain and returns a granted indication.

15 Claims, 7 Drawing Sheets

(51) Int. Cl.
*G06F 21/12* (2013.01)
*G06F 21/60* (2013.01)

(52) U.S. Cl.
CPC ........ *G06F 21/604* (2013.01); *G06F 21/6218* (2013.01); *G06F 2221/2141* (2013.01); *G06F 2221/2145* (2013.01)

(58) Field of Classification Search
CPC ..... G06F 2221/2141; G06F 2221/2145; G06F 21/50; H04L 29/06884
See application file for complete search history.

(56) References Cited

U.S. PATENT DOCUMENTS

| | | | | |
|---|---|---|---|---|
| 9,516,028 | B1* | 12/2016 | Andruschuk | H04L 63/101 |
| 9,665,465 | B1* | 5/2017 | Jain | G06F 11/3604 |
| 9,830,469 | B1* | 11/2017 | Anderson | G06F 21/44 |
| 10,043,030 | B1* | 8/2018 | Kruse | G06F 21/6245 |
| 2001/0011341 | A1* | 8/2001 | Hayes, Jr. | H04L 67/306 712/11 |
| 2004/0010701 | A1* | 1/2004 | Umebayashi | G06F 21/6227 713/193 |
| 2005/0262487 | A1* | 11/2005 | Pistoia | G06F 9/468 717/143 |
| 2006/0053426 | A1* | 3/2006 | Dive-Reclus | G06F 21/57 719/328 |
| 2006/0242064 | A1* | 10/2006 | Jogand-Coulomb | G06F 21/10 705/50 |
| 2007/0006284 | A1* | 1/2007 | Adams | G06F 21/121 726/4 |
| 2007/0039045 | A1* | 2/2007 | McKee | G06F 21/604 726/21 |
| 2008/0077922 | A1* | 3/2008 | Doring | G06F 12/1491 718/100 |
| 2008/0189793 | A1* | 8/2008 | Kirkup | G06F 21/53 726/27 |
| 2009/0300725 | A1* | 12/2009 | Carney | G06F 21/6218 726/4 |
| 2009/0328180 | A1* | 12/2009 | Coles | G06F 21/6281 726/9 |
| 2010/0083386 | A1* | 4/2010 | Kline | G01R 31/31705 726/34 |
| 2010/0242097 | A1* | 9/2010 | Hotes | G06F 21/31 726/4 |
| 2010/0275265 | A1* | 10/2010 | Fiske | G06F 21/32 726/5 |
| 2011/0055277 | A1* | 3/2011 | Resch | H04L 63/20 707/785 |
| 2012/0042362 | A1* | 2/2012 | Vlasov | G06F 21/604 726/4 |
| 2013/0097203 | A1* | 4/2013 | Bhattacharjee | G06F 21/52 707/783 |
| 2013/0125210 | A1* | 5/2013 | Felt | G06F 21/6218 726/4 |
| 2014/0007184 | A1* | 1/2014 | Porras | H04L 63/105 726/1 |
| 2014/0173633 | A1* | 6/2014 | Fiebig | G06F 9/52 719/316 |
| 2015/0006581 | A1* | 1/2015 | Luo | G06F 16/11 707/783 |
| 2015/0119000 | A1* | 4/2015 | Miao | H04W 12/082 455/411 |
| 2015/0121478 | A1* | 4/2015 | Huang | G06F 21/6281 726/4 |
| 2016/0142413 | A1* | 5/2016 | Diep | G06F 9/44526 726/4 |
| 2016/0182527 | A1* | 6/2016 | Lietz | H04L 63/105 726/6 |
| 2016/0191534 | A1* | 6/2016 | Mallozzi | G06F 21/629 726/4 |
| 2016/0232344 | A1* | 8/2016 | Chung | G06F 21/57 |
| 2017/0286193 | A1* | 10/2017 | Wang | G06F 21/6281 |
| 2018/0060244 | A1* | 3/2018 | Godard | G06F 9/00 |

OTHER PUBLICATIONS

"Felt, A., Wang, H., Moshchuk, A., Hanna, S., and Chin, E., Permission Re-Delegation: Attacks and Defenses, 2011, USENIX, pp. 1-16" (Year: 2011).*

"Rangwala, M., Zhang, P., Zou, X., and Li, F., A taxonomy of privilege escalation attacks in Android applications, 2014, Int. J. Security and Networks, vol. 9, No. 1, pp. 40-55" (Year: 2014).*

"Sbirlea, D., Burke, M., Guarnieri, S., Pistoia, M., and Sarkar, V., Automatic Detection of Inter-application Permission Leaks in Android Applications, 2013, IBM Journal of Research and Development, pp. 1-14" (Year: 2013).*

Dietz et al., "Quire: Lightweight Provenance for Smart Phone Operating Systems", 2011, USENIX, pp. 1-16 (Year: 2011).*

Bugiel et al., "Towards Taming Privilege-Escalation Attacks on Android", 2012, NDSS, pp. 1-18 (Year: 2012).*

Gollmann,"Computer Security," 3rd edition, John Willey and Sons, pp. 1-20, Hamburg University of Technology (2011).

"Access Control," pp. 1-10, Retrieved from the internet: https://en.wikipedia.org/wiki/Access_control on (May 30, 2019).

"Confused deputy problem," pp. 1-3, Retrieved from the internet: https://en.wikipedia.org/wiki/Confused_deputy_problem, on (May 30, 2019).

Liu Zhi-Wei et al., "Android Application Behavior Detection based on Rights Management," p. 72-77 (Jun. 2014). with English Abstract.

* cited by examiner

APPARATUS AND METHOD FOR TRACKING ACCESS PERMISSIONS OVER MULTIPLE EXECUTION ENVIRONMENTS

CROSS-REFERENCE TO RELATED APPLICATIONS

This application is a continuation of International Application No. PCT/EP2016/074750, filed on Oct. 14, 2016, the disclosure of which is hereby incorporated by reference in its entirety.

TECHNICAL FIELD

The aspects of the present disclosure relate generally to computer security and more particularly to tracking access permissions across multiple execution environments and computing devices.

BACKGROUND

Security and access control is becoming increasingly important in modern computing devices. This is evidenced by the proliferation of banking and payment applications running on smart phones and other mobile computing apparatus. Keeping these applications safe and secure requires assigning and tracking different privileges and access permissions to applications when accessing resources and information in a multi-device and multi-user computing environment.

Many systems adhere to the principle of least privilege, where applications should be able to access only the information and resources necessary to carry out their legitimate actions and not more. To support this principle, various access control mechanisms have been created to ensure different applications are granted different privileges and access permissions allowing each application to perform only its legitimate actions. These access control mechanisms use permissions to restrict and/or limit the resources and information an application can access.

A common conventional approach to providing access control can be described as an abstract security model or access control matrix, where access decisions are made based on a single subject's identity and the resource or information being accessed. However, in real systems, applications can launch other applications or can be launched by different users to perform different and possibly higher privilege tasks. This can lead to a complex chain of processes leading up to a particular access request thereby resulting in unprivileged or unauthorized applications gaining access to resources, information, and application programming interfaces (APIs) via privileged applications and services. An example of this problem is illustrated by what is known as the "confused deputy attack."

Thus there is a need for improved access control mechanisms and apparatus that can effectively track permissions and privileges across multiple execution environments and multiple computing devices. Accordingly, it would be desirable to provide a concept that addresses at least some of the problems identified above.

SUMMARY

Embodiments of the disclosure to provide an improved access control mechanisms and apparatus. This object is solved by the subject matter of the independent claims. Further advantageous modifications can be found in the dependent claims.

According to a first aspect of the disclosure the above and further objects and advantages are obtained by an apparatus that includes a processor coupled to a memory, wherein the memory is configured to store a set of permission chains, and each permission chain includes an indication that a prior process accessed a current process and the current process requested access to a next process. The processor is configured to receive a permission request from a calling process, where the permission request includes a request for an access permission to allow a first current process to access a first next process and an indication that the first current process was accessed from a first prior process. The processor then searches the set of permission chains for a matching permission chain, wherein the matching permission chain includes a second prior process that is the same as the first prior process, a second current process that is the same as the first current process, and a second next process that is the same as the first next process. When the matching permission chain is not found, the processor is configured to receive an input granting or denying the requested permission, and when the received input grants the requested permission, the processor is configured to update the set of permission chains to include a new permission chain where the new permission chain includes an indication that the first prior process accessed the first current process and the first current process requested access to the first next process, and to grant the requested permission to the calling process. The aspects of the present disclosure provide improved access control mechanisms and apparatus that can effectively track permissions and privileges across multiple execution environments and multiple computing devices.

In a first possible implementation form of the apparatus according to the first aspect as such when the matching permission chain is not found the processor is configured to output a prompt requesting the input granting or denying the requested permission. The use of a prompt provides the ability to obtain the requested permission from a user of the computing apparatus.

In a second possible implementation form of the apparatus according to the first aspect as such or according to the first possible implementation form of the first aspect, each permission chain includes an associated granted or denied status and when the received input denies the requested permission, the processor is configured to update the set of permission chains to include the new permission chain and to set the associated granted or denied status to denied. Saving both the denied as well as the granted status reduces the number of times the user needs to be involved in the access permission determination.

In a third possible implementation form of the apparatus according to the first aspect as such or according to the first or second possible implementation forms of the first aspect, when the matching permission chain is found in the set of permission chains, the processor is configured to return the associated granted or denied status to the calling process. Returning both a granted or denied status allows the calling process to be positively notified when a requested permission is denied.

In a fourth possible implementation form of the apparatus according to the first aspect as such or according to any of the preceding possible implementation forms of the first aspect, the first prior process includes a first set of processes accessed prior to the first current process, and the second prior process includes a second set of processes accessed prior to the second current process, and wherein the processor is configured to find the matching permission chain based on the first set of prior processes and the second set of prior processes. Tracking a full list of prior processes rather than just a single prior process helps prevent unauthorized users from gaining access to a resource via a long set of inter-process calls.

In a fifth possible implementation form of the apparatus according to the fourth possible implementation form of the first aspect, the first and second set of prior processes each include an ordered list of prior processes, where the order of the list indicates an order in which each process was accessed. The processor is configured to find the matching permission chain when the indicated order of the first set of prior processes matches the indicated order of the second set of prior processes. Maintaining both the list of prior processes as well as the order in which they were accessed provides improved control over the way permissions are granted or denied.

In a sixth possible implementation form of the apparatus according to the fourth or fifth possible implementation forms of the first aspect, the first set of prior processes includes device identifiers corresponding to multiple devices, and the processor is configured to display a prompt on a device associated with the first current process or display a prompt on a device associated with the first next process. Further improvements in access control can be achieved by tracking both the prior processes that were accessed as well as the device on which each prior process was accessed.

In a seventh possible implementation form of the apparatus according to the first aspect as such or according to any of the preceding possible implementation forms of the first aspect, the memory includes a set of policies. When a matching permission chain is not found, the processor is configured to determine the granted or denied status based on the set of policies and the permission request. The set of policies provides a default or fallback position to aide access determination when no matching permission chain is available.

In an eighth possible implementation form of the apparatus according to the first aspect as such or according to any of the preceding possible implementation forms of the first aspect, the processor is configured to combine two or more permission chains in the set of permission chains to form the matching permission chain. Combining permission chains allows the processor to create additional permission chains as needed and infer the granted or denied status from the permission chains that were combined.

In a ninth possible implementation form of the apparatus according to the first aspect as such or according to any of the preceding possible implementation forms of the first aspect, the set of permission chains includes one or more predetermined permission chains configured to protect a predetermined set of processes. Including predetermined permission chains allows a system administrator or other entity to force certain access permissions and/or to override a user's inputs.

In a tenth possible implementation form of the apparatus according to the first aspect as such or according to any of the preceding possible implementation forms of the first aspect, the processor is configured to persist the set of permission chains to a non-volatile computer readable storage medium. Saving the set of permission chains to non-volatile storage avoids the need to recreate a possibly large set of access permissions each time a process is re-started.

In an eleventh possible implementation form of the apparatus according to the first aspect as such or according to any of the preceding possible implementation forms of the first aspect, the first next process includes a first resource indication, the second next process includes a second resource indication, and the processor is configured to determine the matching permission chain based on the first resource indication and the second resource indication. Including the resource information in the process information provides improved control of access permissions.

According to a second aspect of the invention the above and further objects and advantages are obtained by a method that includes receiving a permission request from a calling process, wherein the permission request includes a request for an access permission to allow a first current process to access a first next process and an indication that the first current process was accessed from a first prior process and searching a set of permission chains for a matching permission chain, wherein the matching permission chain has a second prior process that is the same as the first prior process, a second current process that is the same as the first current process, and a second next process that is the same as the first next process. Each permission chain in the set of permission chains includes an indication that a prior process accessed a current process and the current process requested access to a next process. When the matching permission chain is not found, an input granting or denying the requested permission is received, and when the received input grants the requested permission, the set of permission chains is updated to include a new permission chain. The new permission chain includes an indication that the first prior process accessed the first current process and the first current process requested access to the first next process. The requested permission to the calling process is granted. The aspects of the present disclosure provide improved access control mechanisms that can effectively track permissions and privileges across multiple execution environments and multiple computing devices.

In a first possible implementation form of the method according to the second aspect, each permission chain includes an associated granted or denied status and when the received input denies the requested permission, the set of permission chains is updated to include the new permission chain and to set the associated granted or denied status to denied. Saving both the denied as well as the granted status reduces the number of times the user needs to be involved in the access permission determination.

According to a third aspect of the invention the above and further objects and advantages are obtained by a computer program including non-transitory computer program instructions that when executed by a processor cause the processor to execute the method according to the second aspect as such or the first implementation form of the second aspect.

BRIEF DESCRIPTION OF THE DRAWINGS

In the following detailed description, the disclosure will be explained in more detail with reference to the example embodiments shown in the drawings, in which.

DETAILED DESCRIPTION

Figure 1:
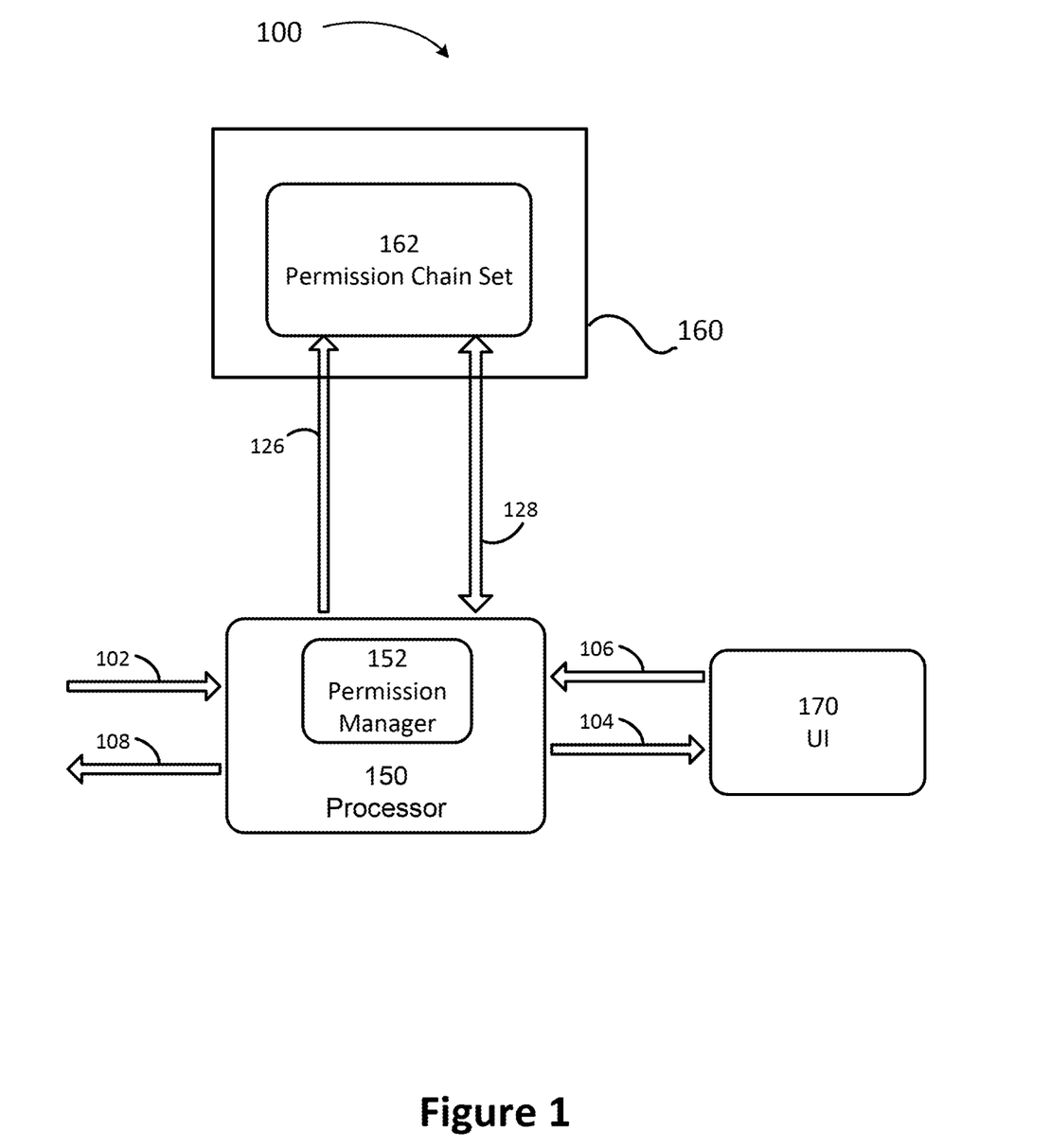
FIG. 1 illustrates an exemplary apparatus configured to manage access permissions in a computing system incorporating aspects of the disclosed embodiments.

FIG. 1 illustrates an exemplary apparatus 100 configured to manage access permissions in a computing system. The exemplary apparatus 100 uses a processor 150 coupled to a memory 160, and in certain embodiments the processor 150 is also coupled to a user interface (UI) 170. The processor 150 is configured to execute a permission manager application 152 which will receive a permission request 102, determine whether the permission should be granted or denied, and return 108 a granted or denied status. Granting permissions based only on the requesting process and requested resource can lead to security issues such as the well-known confused deputy attack. Security problems of this nature can be solved by including information about the call or process chain that led up to the current application when determining whether to grant or deny access to resources. The call or process chain, referred to herein as a prior process or list of prior processes, includes, as will be discussed further below, all or at least a portion of the processes that were traversed prior to the current process that is requesting the access permission 102.

The processor 150 may be a single processing device or may comprise a plurality of processing devices including special purpose devices, such as for example, digital signal processing (DSP) devices, microprocessors, specialized processing devices, parallel processing cores, or general purpose computer processors. The processor 150 may also include a central processing unit (CPU) working in tandem with a graphics processing unit (GPU) which may include a DSP or other specialized graphics processing hardware. Program instructions stored in the memory 160 are read and executed by the processor 150 and cause the processor 150 to perform the novel methods and processes for managing permissions described herein. In certain embodiments the processor 150 may be configured to run a general purpose operating system and to execute multiple software applications or services at substantially the same time where each application or service is typically run in a separate isolated execution environment or process space. One such software application, which when desired may be run by the processor 150 in an isolated process space under control of or as a service provided by an operating system is a permission manager 152 application which as will be described further below is configured to manage permissions and permission chains for the purpose of managing access to various computer resources.

The memory 160 may be a combination of various types of volatile and non-volatile computer memory including random access memory (RAM), such as the synchronous dynamic random-access memory (SDRAM) or double data rate DDR-SDRAM common in conventional personal computing devices, or read only memory (ROM). The memory 160 may also include non-volatile memory (NVM) such as hard disk drives (HDD), solid state drives (SDD), optical disk drives (ODD), network attached storage (NAS), etc.

The memory 160 stores computer program instructions that may be accessed and executed by the processor 150 to cause the processor to perform a variety of desirable computer implemented processes or methods such as the permission management methods described herein.

The UI 170 may include one or more user interface elements such as a touch screen, keypad, buttons, audio or voice interface, as well as other elements adapted for exchanging information with a user. The UI 170 may also include a display unit configured to display a variety of information appropriate for a computing apparatus or mobile user equipment and may be implemented using any appropriate display type such as for example organic light emitting diodes (OLED), liquid crystal display (LCD), as well as less complex elements such as LEDs or indicator lamps. The UI 170 is configured to prompt a user for input by asking the user a question and receiving an answer from the user. This may be accomplished with a graphical user interface (GUI) by displaying a question and retrieving an answer via GUI controls or buttons. Alternatively, the prompt may be provided via an audio device by playing a voice message and listening via a microphone or other suitable audio input device for a verbal answer from the user or tones generated by a phone keypad. Any means for presenting a question to a user and receiving a user response may be advantageously employed for prompting the user and receiving an input.

When a permission request 102 is received, the processor 150 checks or searches 126 a set of permission chains 162, which are stored in the memory 160, for a matching permission chain. The permission request 102 has information regarding the current process, which include information about the calling application requesting the access permission. The permission request 102 also includes information indicating the next process where the next process is the process or resource for which access permission is being requested.

To help prevent an unauthorized user from gaining access to a protected resource by launching a complex series of processes, the permission request 102 also includes information about any processes that were accessed or traversed prior to the current process. The term process when used in association with a permission request or permission chain to refer to a prior process, a current process, or a next process, refers to a data structure including information about an entity or an executing computer process, and may for example include information about the executing software application, any computer resources that were accessed, the associated user, and the associated device, as well as other information suitable for making permission determinations.

The information included in a process may be any information appropriate for making a determination about whether to grant or deny the calling or current process access to a resource. In certain embodiments it may be appropriate to include information about the device, such as a device identifier, on which a process is running. Including in a process, information about the device on which the process is executing is useful in embodiments where permission chains extend over multiple devices.

The permission request 102 can be viewed as including a chain of permissions granted prior to the current permission request 102, where the chain of permissions includes each prior process that was accessed or traversed before entering the current process, along with the current process. Thus the requested permission is actually a request for a permission chain that includes all prior processes, the current process, and the next process.

A set of permission chains 162 is maintained by the processor 150 in a portion of the memory 160 that is accessible by the processor 150 or more particularly accessible by the permission manager 152 process or application being executed by the processor 150. The set of permission chains 162 may be stored in the memory 160 of the apparatus 100, or alternatively the set of permission chains 162 may be stored in any suitable computer accessible storage with which the processor 150 may communicate and access. The set of permission chains includes (preferably all) previously granted permission chains. Of course it could be possible, that granted permission chains could be deleted from the set of permission chains again, for example manually by a user or automatically if a validity time span of a permission chain is overdue.

This set of permission chains is searched 128 to determine if the currently requested access permission has already been granted. When a permission chain is found in the set of permission chains 162 that matches the permission request 102 then information is returned 108 to the calling application or process granting the requested permission.

A matching permission chain is one in which the prior process, or list of prior processes and the current process included in the permission chain are the same as the prior process or processes and current process in the permission request 102, and where the next process of the permission chain is the same as the next process of the permission request 102. The next process of a permission request 102 refers to the resource, service, or process for which access permission is being requested. In certain embodiments it may also be advantageous to verify that the order of the prior processes in the permission chain is the same as the order of prior processes in the permission request 102.

When a matching permission chain is not found in the set of permission chains 162, a prompt 104 may be provided via the UI 170 where the prompt is configured to describe the requested permission 102 to the user and obtain an input from a user of the apparatus 100 granting or denying the permission request 102. The user responds to the prompt by providing an input 106 to the processor 150 granting or denying the requested permission request 102.

When the input 106 grants the permission request 102, the processor 150 updates 126 the set of permission chains 162 to include the granted permission and returns 108 a response granting the permission request 102. In certain embodiments it is advantageous to include all requested permission chains, both the granted permission chains as well as those that were denied, in the set of permission chains and associate a granted/denied status with each permission chain in the set of permission chains 162. Recording both the denied as well as granted permission chains in the set of permission chains 162 allows the permission manager 152 when desired to avoid repeatedly asking for a permission that has previously been denied by the user. Thus when a permission chain is found in the set of permission chains 162, the associated granted or denied status may be returned without the need for prompting the user and receiving another input 106.

In modern computing environments, a single user action can engage many different applications on many different computing devices and can also involve multiple users. For example when an employee searches for a contact on their corporate mobile phone, the phone may search the local phone contacts, then search a corporate database, and may also search local contacts stored on mobile phones of other employees. Thus permission chains can span multiple computing devices and may involve multiple users. When permission chains span multiple devices, a device identifier may be included in each process in the permission chain indicating the device to which the process is associated. In embodiments where permission chains span multiple devices, the permission requests 102 may also span multiple devices. The permission manager 152 may then determine the device on which the prompt 104 should be displayed.

For example in certain embodiments the prompt 104 may be displayed on the device associated with the current process that is making the permission request 102. Alternatively it may be desirable to display multiple prompts to multiple users when a permission request 102 spans processes associated with different devices and/or users. For example, in the contact search example described above, it may be desirable to prompt both the user initiating the search as well as the user of the device where the local contacts are stored before searching the local contacts on another employee's phone.

Figure 2:
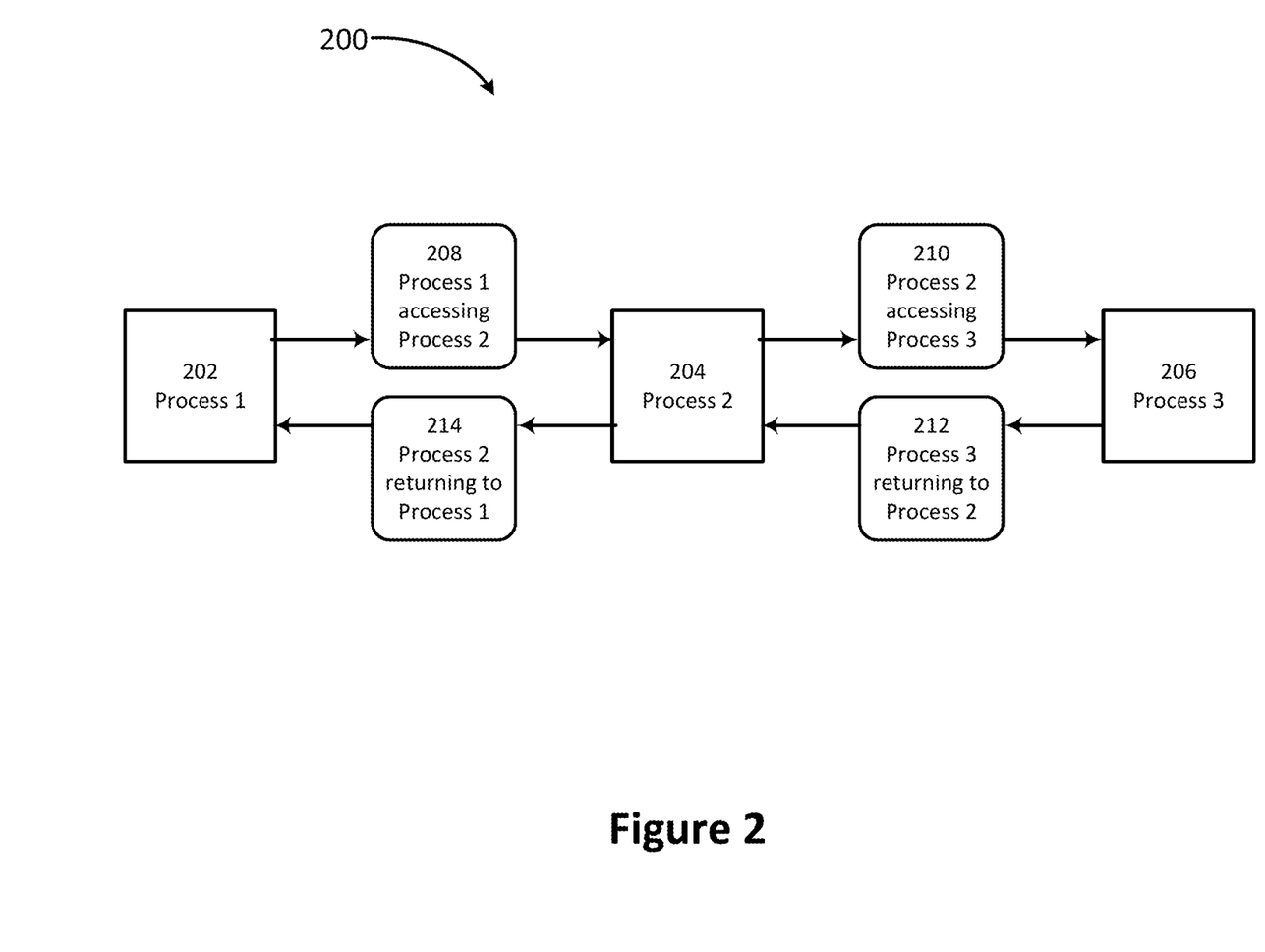
FIG. 2 illustrates an exemplary permission chain incorporating aspects of the disclosed embodiments.

FIG. 2 illustrates an exemplary permission chain 200 between three processes 202, 204, 206. The first process 202 accesses the second process 204 with a call 208 originating in the first process 202 and accessing a routine or resource in the second process 204. The second process 204 then accesses the third process 206 with a call 210 originating in the second process 204 and accessing a resource in the third process 206. Once the requested operation is complete the call 210 returns 212 from the third process 206 to the second process 204. The return 212 may include data or other information provided by the third process 206. The call 208 then returns 214 from the second process 204 back to the first process 202, and may return the information returned 212 from the third process 206 and/or may return 214 data originating in the second process 204. This series of processes 202, 204, 206 calls 208, 210 and returns 212, 214 represents a permission chain. Permission must be granted for each call 208, 210 in the permission chain. When the first process 202 needs to make the call 208 to the second process 204 it must first be granted permission. Similarly the second process 204 needs to obtain permission before making the call 210 to the third process 206. The permissions may be obtained by sending a permission request, such as the permission request 102, to a permission manager, such as the permission manager 152 described above and with reference to FIG. 1.

For example to obtain permission for the second process 204 to make a call 210 to the third process 206, the second process 204 can as described above send a permission request 102 to a permission manager 152. Information about the first process 202 and the associated first call 208 would be included as the prior process of the permission request, information about the second process 204 would be included as the current process of the permission request, and the third process 206 and the call 210 for which access permission is desired would be included as the next process of the permission request.

Figure 3:
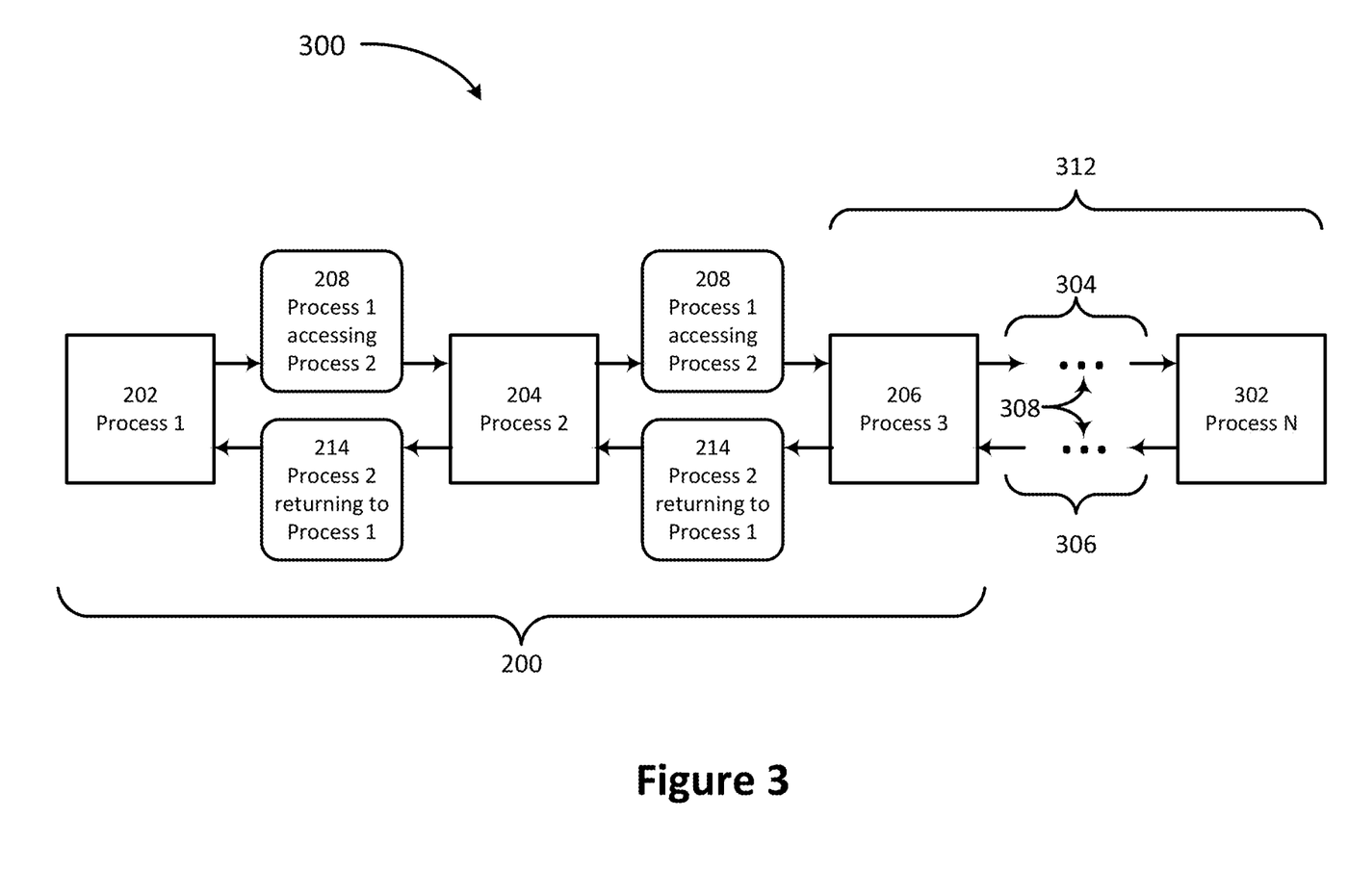
FIG. 3 illustrates an exemplary extended permission chain incorporating aspects of the disclosed embodiments.

FIG. 3 illustrates an exemplary extended permission chain 300 including more than three processes 202, 204, 206, 302. The permission chain 300 is similar to the permission chain 200 described above, however it includes additional processes 302 accessed through additional calls 304 and includes additional returns 306 associated with the additional calls 304. The dotted lines 308 are used to illustrate that any number of additional calls 304, additional returns 306 and additional processes 302 may be included in the permission chain 300, and that permission chain 300 can be of any desired length, e.g. a permission chain may include any number of processes each with associated call and/or resource information.

Each additional call 304 to a process 302 requires permission to be granted. When a matching permission chain is not found in the set of permission chains 162, the permission manager 152 needs to prompt the user to obtain the requested permission. In certain embodiments it is desirable to reduce the frequency of user prompts by allowing the permission manager 152 to combine smaller permission chains that may already be included in the set of permission chains 162 to form the requested permission 102. For example, consider the case where the permission chain 200 has already been granted and included in the set of permission chains 162, and a second permission chain 312 has also been granted and included in the set of permission chains 162 where the smaller permission chain allows the third process 206 to call 304 additional processes 302. In this case it may be desirable to allow the permission manager 152 to combine the permission chain 200 with the permission chain 312 to create a longer permission chain matching the requested permission, and to grant the requested permission based on this newly created permission chain, thereby eliminating the need to prompt 104 the user and receive an input 106.

Figure 4:
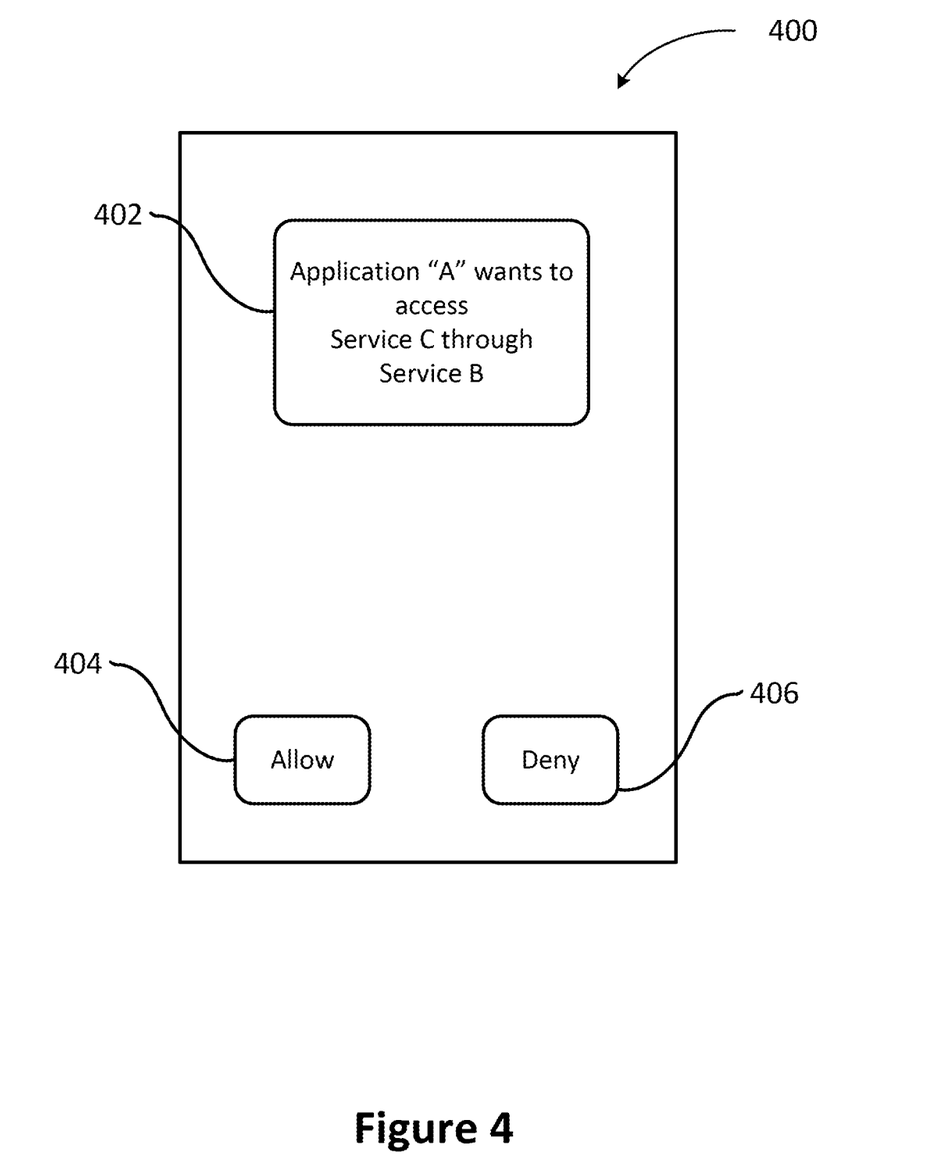
FIG. 4 illustrates an exemplary permissions prompt according to aspects of the disclosed embodiments.

FIG. 4 illustrates an exemplary permissions prompt 400 that may be displayed to allow a user to grant or deny a requested access permission according to aspects of the disclosed embodiments. The prompt 400 may be displayed to the user via the user interface 170 when the permission manager 152 requires an input 106 from a user. The prompt 400 displays information 402 clearly describing the access permission being requested. In certain embodiments it is desirable to present a user friendly message rather than a more technical representation of the desired permission chain to be granted.

For example when requesting permission for the permission chain 200 illustrated in FIG. 2 above, the prompt could present a message in engineering terms asking that "Process 1 be allowed to access process 3 through process 2". Alternatively a user friendly message may be displayed such as "Application A wants to access service C through service B". The user may then select the appropriate user interface control 404, 406 to allow 404 or deny 406 the requested access permission.

When the requested permission involves processes on multiple devices the permission manager 152 may be configured to select the most appropriate device on which to display the prompt 400 based on the permission request 102. In certain embodiments it may be desirable to display the prompt 400 on multiple devices to solicit input from all users that may have an interest in the requested access permission. Those skilled in the art will readily recognize that any type of a user prompt, such as textual displays in conjunction with mechanical buttons, GUI based displays and controls, or audio input/output devices may be used without straying from the spirit and scope of the present disclosure. In certain embodiments is may be advantageous to use audio prompts and input devices, such as for example by playing a voice message for the user and listening for a verbal response or tones generated by a phone keypad.

Figure 5:
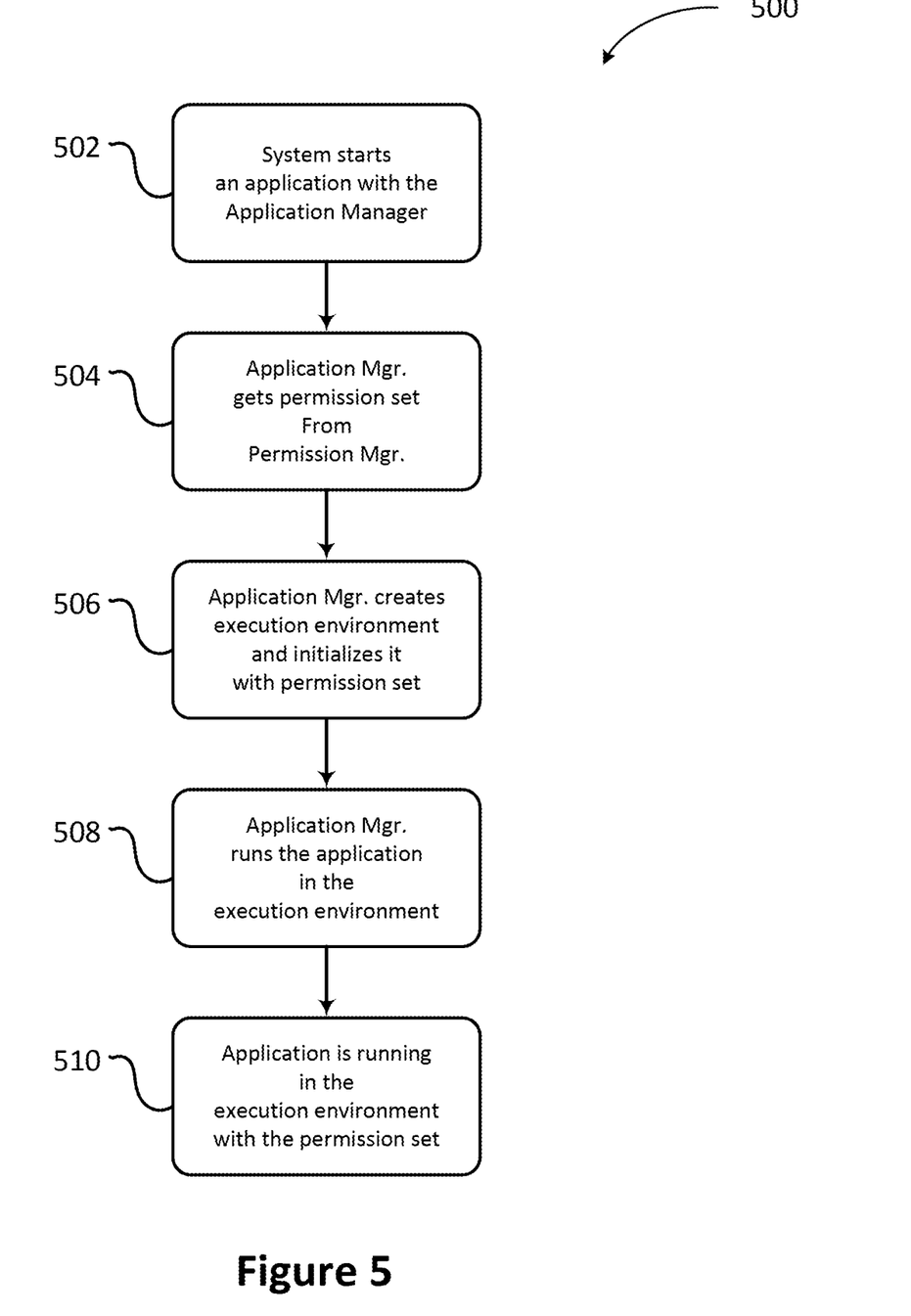
FIG. 5 illustrates an exemplary startup process incorporating aspects of the disclosed embodiments.

FIG. 5 illustrates an exemplary startup process 500 suitable for starting an application where the applications need to interact with or include a permission manager such as the permission manager 152 described above. The operating system, or other software program used to manage execution environments on the computing device, requests that an application manager start 502 an application. The application manager is part of an operating system or other controlling software process responsible for managing the execution of user applications. Starting an application may be based on a request from the user of the computing device or it may be due to some other system related event or receipt of a request from an external source.

The application manager then obtains or receives 504 a permission set for the application from a permission service or other suitably configured permission source or manager. The permission set includes an initial or predetermined set of permission chains that are to be associated with the newly starting process. In certain embodiments the permission set may also include a set of policies which may be used to control certain access permissions and restrictions in conjunction with or instead of the set of permission chains.

Next the application manager creates 506 a new execution environment for the application. The created execution environment may include an isolated process space within the system, and is initialized using the permission set previously obtained 504 from the permission manager. The application manager then starts or runs 508 the application within the initialized execution environment. The application is now running 510 within an isolated process space under control of the permission set, and has only the access permissions provided by the initial set of permissions. As the application continues to execute, it may obtain additional permissions via a permission manager, such as the permission manager 152, which will also update the set of permission chains included in its permission set. When setting up and initializing 506 the execution environment it may be beneficial for the application manager to associate a unique application identifier and optionally a device identifier with the process to aid the permission manager in managing access permissions throughout the lifecycle of the application.

Figure 6:
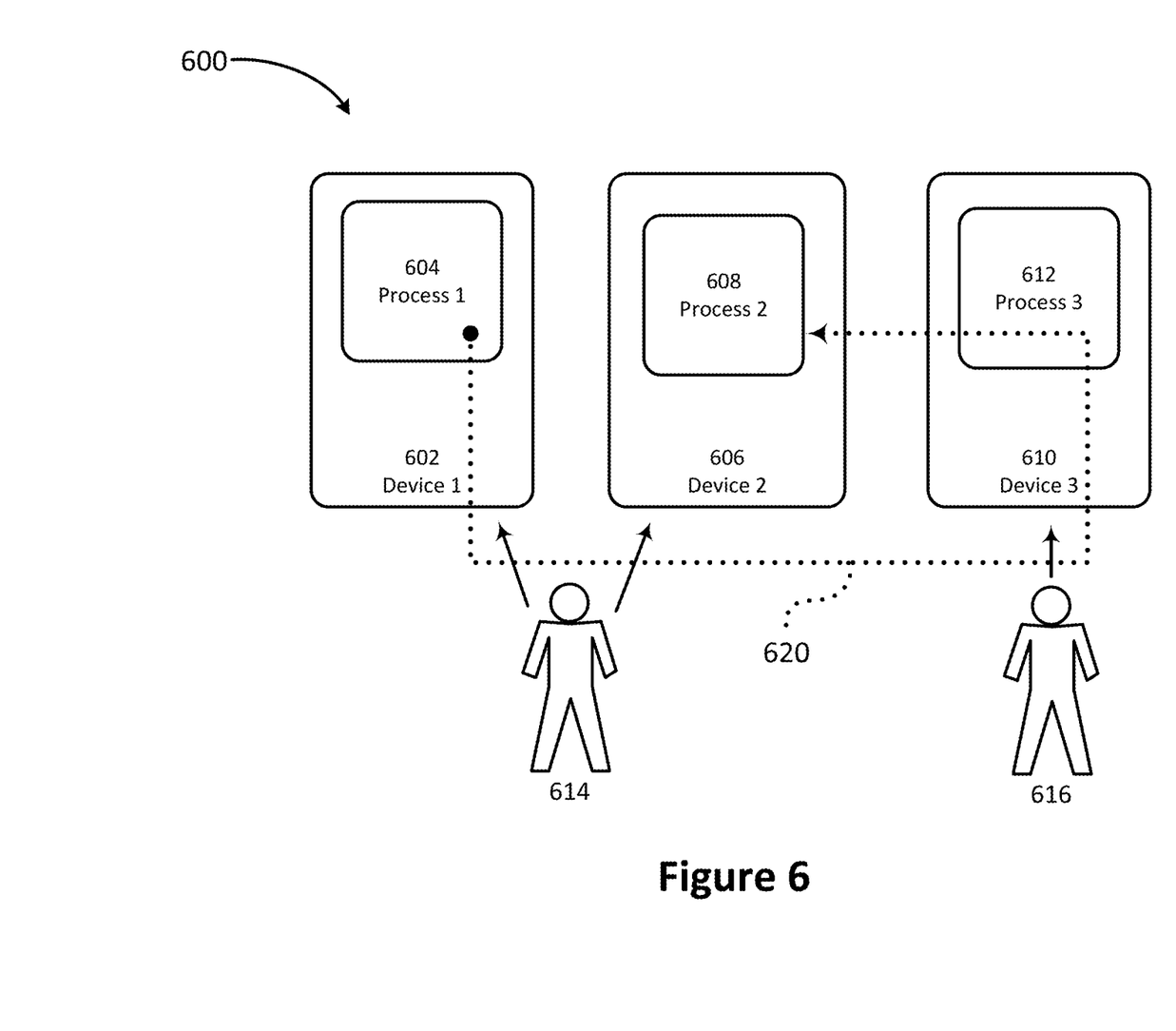
FIG. 6 illustrates a pictorial diagram of a permission chain spanning multiple devices and multiple users incorporating aspects of the disclosed embodiments.

Referring now to FIG. 6 there can be seen a pictorial diagram of a permission chain 620 that spans three processes 604, 608, 612, executing on three different devices 602, 606, 610 under the control of two users 614, 616. A permission manager, such as the permission manager 152, may be advantageously employed in a cloud operating system that can have public computing devices shared by multiple different users. The cloud operating system may be capable of servicing multiple users 614, 616 each having their own computing device 602, 606, 610. As illustrated in FIG. 6 a permission chain 620 in such a cloud environment 600 may be formed over multiple computing devices 602, 606, and 610 that are being used by multiple users 614, 616. When this occurs, the permission manager may need to prompt and receive inputs from multiple users 614, 616 on multiple devices 602, 606, 610 before a permission chain can be granted. The permission chain 620 illustrates an example of such a permission chain that stretches over multiple execution environments or processes 604, 608, 612, and multiple devices 602, 606, 610, which are being operated by multiple users 614, 616.

Figure 7:
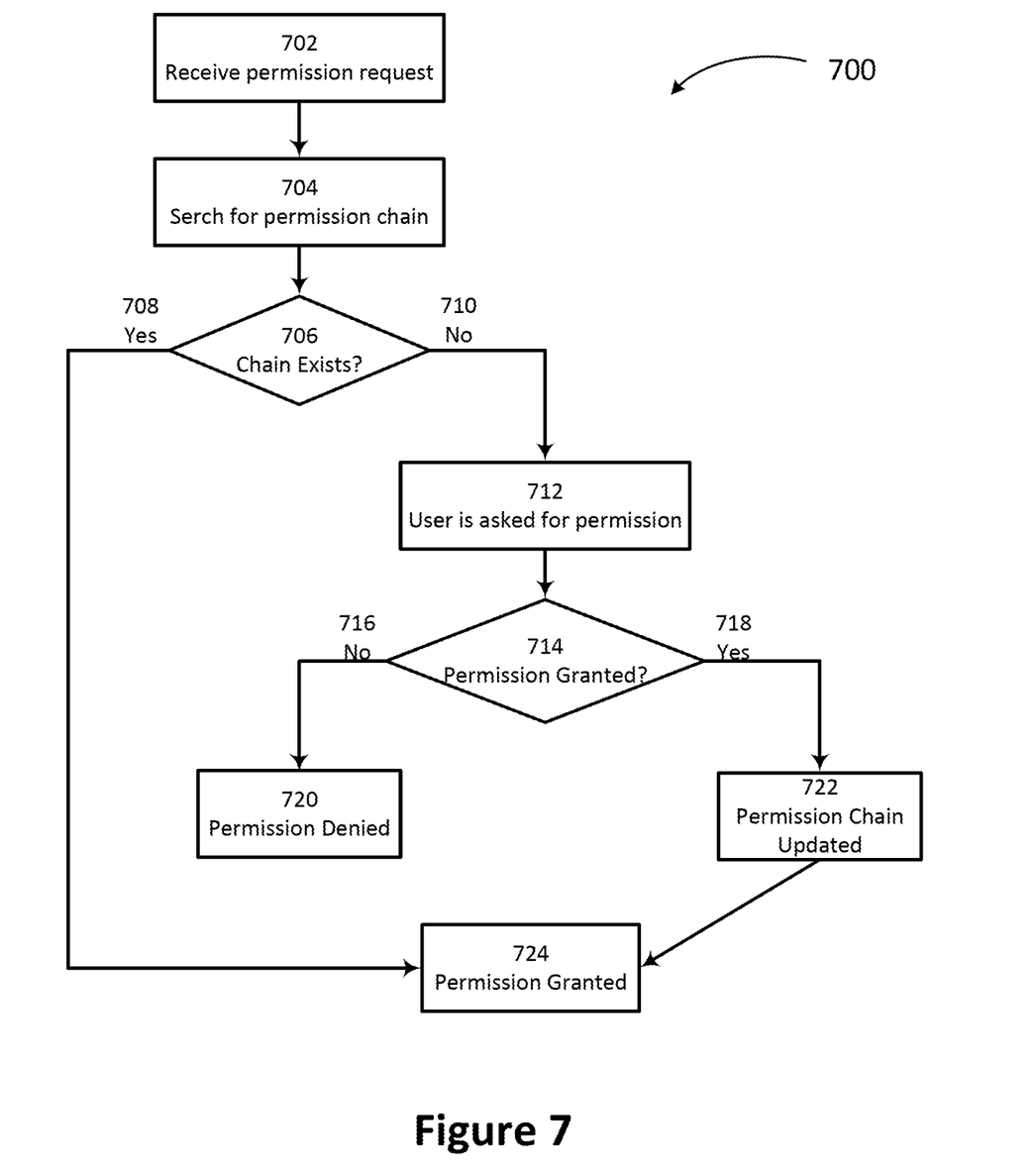
FIG. 7 illustrates a flow chart of an exemplary process appropriate for managing access permissions according to aspects of the disclosed embodiments.

FIG. 7 illustrates a flow chart of an exemplary process 700 for managing access permissions according to aspects of the disclosed embodiments. The exemplary process 700 may be performed by an apparatus configured to manage access permissions, such as the apparatus 100 and permission manager 152 described above and with reference to FIG. 1. The process 700 may be advantageously employed in any computing apparatus that has a need to manage access permissions across multiple processes, users, and devices. The process 700 begins when a permission request is received 702. The permission request includes information about the resource, such as a service or process, for which access is being requested, information indicating the calling or current process requesting the access permission, and any prior processes that were traversed or called prior to or leading up to the current process. The resource, service, or process for which access is being requested may be referred to as the next process of the permission request.

A set of permission chains is searched 704 for a permission chain that matches the requested permission. A matching permission chain is one having a current process that is the same as the current process of the permission request, a next process that is the same as the next process of the permission request, and a set of one or more prior processes that are the same as the set of prior processes included in the permission request. The process 700 then branches 706 based on whether a matching permission chain has been found. When a matching permission chain is found 708, the requested permission is granted 724. When a matching permission chain is not found 710, the associated user is asked 712 to grant or deny the requested permission. The user is asked 712 by providing a prompt to the user describing the access permission being requested and receiving an input form the user granting or denying the requested permission.

The input received from the user is then checked 714 to determine if the requested permission was granted or denied. When the permission is denied 716, a permission denied indication is returned 720 to the calling process and the process 700 ends. When the permission is granted by the user 718, the set of permission chains is updated 722 to include the newly granted permission chain. Updating the set of permission chains allows a previously prompted permission request to be immediately granted, without having to involve the user a second time. After the set of permission chains has been updated, a permission granted indication is returned 724 to the caller.

In certain embodiments it is desirable to populate the set of permission chains with a predetermined set of permission chains when a process first is initialized. Populating an initial set of permission chains reduces the possibility of displaying an excessive number of user prompts when an application starts. The initial set of permission chains may be determined for example by using historical data to predict the starting set of permission chains, or by any desired approach.

In certain embodiments it is beneficial to include access policies along with the set of permission chains and use these policies to influence the grant/deny determinations resulting from the process 700. For example a corporation may want to prevent accessing financial accounts outside banking hours or from computing devices outside the corporate network. This policy could be used to override a user input or existing permission chain, or to make grant/deny determinations when a permission chain is not found.

Thus, while there have been shown, described and pointed out, fundamental novel features of the disclosure as applied to the exemplary embodiments thereof, it will be understood that various omissions, substitutions and changes in the form and details of apparatus and methods illustrated, and in their operation, may be made by those skilled in the art without departing from the spirit and scope of the present disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. An apparatus comprising a processor coupled to a memory, wherein the memory comprises a set of permission chains, and wherein each permission chain comprises an indication that a prior process accessed a current process and the current process requested access to a next process, wherein the processor is configured to:

receive a permission request from a calling process, wherein the permission request comprises a request for an access permission to allow a first current process to access a first next process and an indication that the first current process was accessed from a first prior process; and search the set of permission chains for a matching permission chain, wherein the matching permission chain comprises prior processes that were accessed or traversed before entering the first current process, a second prior process that is the same as the first prior process, a second current process that is the same as the first current process, and a second next process that is the same as the first next process, wherein the set of permission chains includes all previously granted permission chains that comprise at least two permission chains previously granted until all of the previously granted permission chains are automatically deleted from the set of permission chains in response to a validity time span of a permission chain is overdue; and wherein when the matching permission chain is not found, the processor is configured to receive an input granting or denying the requested permission; and when the received input grants the requested permission, the processor is configured to:

update the set of permission chains to include a new permission chain comprising an indication that the first prior process accessed the first current process and the first current process requested access to the first next process; and grant the requested permission to the calling process.

2. The apparatus according to claim 1, wherein when the matching permission chain is not found, the processor is configured to output a prompt requesting the input granting or denying the requested permission.

3. The apparatus according to claim 1, wherein the each permission chain comprises an associated granted or denied status, and wherein when the received input denies the requested permission, the processor is configured to:

update the set of permission chains to include the new permission; and set the associated granted or denied status to denied.

4. The apparatus according to claim 3, wherein when the matching permission chain is found in the set of permission chains, the processor is configured to return the associated granted or denied status to the calling process.

5. The apparatus according to claim 1, wherein the first prior process comprises a first set of prior processes accessed prior to the first current process, and the second prior process comprises a second set of prior processes accessed prior to the second current process, and wherein the processor is configured to find the matching permission chain based on the first set of prior processes and the second set of prior processes.

6. The apparatus according to claim 5, wherein the first and second sets of prior processes each comprise an ordered list of prior processes indicating an order in which each process was accessed, and wherein the processor is configured to find the matching permission chain when the indicated order of the first set of prior processes matches the order of the second set of prior processes.

7. The apparatus according to claim 5, wherein the first set of prior processes comprises device identifiers corresponding to multiple devices, and
wherein the processor is configured to display a prompt on a device associated with the first current process or display a prompt on a device associated with the first next process.

8. The apparatus according to claim 1, wherein the memory further comprises a set of policies, and wherein when a matching permission chain is not found, the processor is configured to determine the granted or denied status based on the set of policies and the permission request.

9. The apparatus according to claim 1, wherein the processor is configured to combine two or more permission chains in the set of permission chains to form the matching permission chain.

10. The apparatus according to claim 1, wherein the set of permission chains comprises one or more predetermined permission chains configured to protect a predetermined set of processes.

11. The apparatus according to claim 1, wherein the processor is configured to persist the set of permission chains to a non-volatile computer readable storage medium.

12. The apparatus according to claim 1, wherein the first next process comprises a first resource indication, wherein the second next process comprises a second resource indication, and wherein the processor is configured to determine the matching permission chain based on the first resource indication and the second resource indication.

13. A method comprising:
receiving a permission request from a calling process, wherein the permission request comprises a request for an access permission to allow a first current process to access a first next process and an indication that the first current process was accessed from a first prior process; and
searching a set of permission chains for a matching permission chain, wherein the matching permission chain comprises prior processes that were accessed or traversed before entering the first current process, a second prior process that is the same as the first prior process, a second current process that is the same as the first current process, and a second next process that is the same as the first next process, wherein each permission chain in the set of permission chains comprises an indication that a prior process accessed a current process and the current process requested access to a next process, wherein the set of permission chains includes all previously granted permission chains that comprise at least two permission chains previously granted until all of the previously granted permission chains are automatically deleted from the set of permission chains in response to a validity time span of a permission chain is overdue;
wherein when the matching permission chain is not found, the method comprises receiving an input granting or denying the requested permission; and
wherein when the received input grants the requested permission, the method comprises:
updating the set of permission chains to include a new permission chain comprising an indication that the first prior process accessed the first current process and the first current process requested access to the first next process; and
granting the requested permission to the calling process.

14. The method according to claim 13, wherein each permission chain comprises an associated granted or denied status, and wherein when the received input denies the requested permission, the method comprises:
updating the set of permission chains to include the new permission chain; and
setting the associated granted or denied status to denied.

15. A non-transitory computer-readable storage medium storing program instructions that when executed by a processor cause the processor to:
receive a permission request from a calling process, wherein the permission request comprises a request for an access permission to allow a first current process to access a first next process and an indication that the first current process was accessed from a first prior process; and
search a set of permission chains for a matching permission chain, wherein the matching permission chain comprises prior processes that were accessed or traversed before entering the first current process, a second prior process that is the same as the first prior process, a second current process that is the same as the first current process, and a second next process that is the same as the first next process, wherein each permission chain in the set of permission chains comprises an indication that a prior process accessed a current process and the current process requested access to a next process, wherein the set of permission chains includes all previously granted permission chains that comprise at least two permission chains previously granted until all of the previously granted permission chains are automatically deleted from the set of permission chains in response to a validity time span of a permission chain is overdue;
wherein when the matching permission chain is not found, the program instructions cause the processor to receive an input granting or denying the request permission; and
wherein when the received input grants the requested permission, the program instructions cause the processor to:
update the set of permission chains to include a new permission chain comprising an indication that the first prior process accessed the first current process and the first current process requested access to the first next process; and
grant the requested permission to the calling process.

* * * * *